April 27, 1965
E. A. VIALE ETAL
3,181,040
OIL BATH SOLENOID
Filed July 30, 1962
2 Sheets-Sheet 1
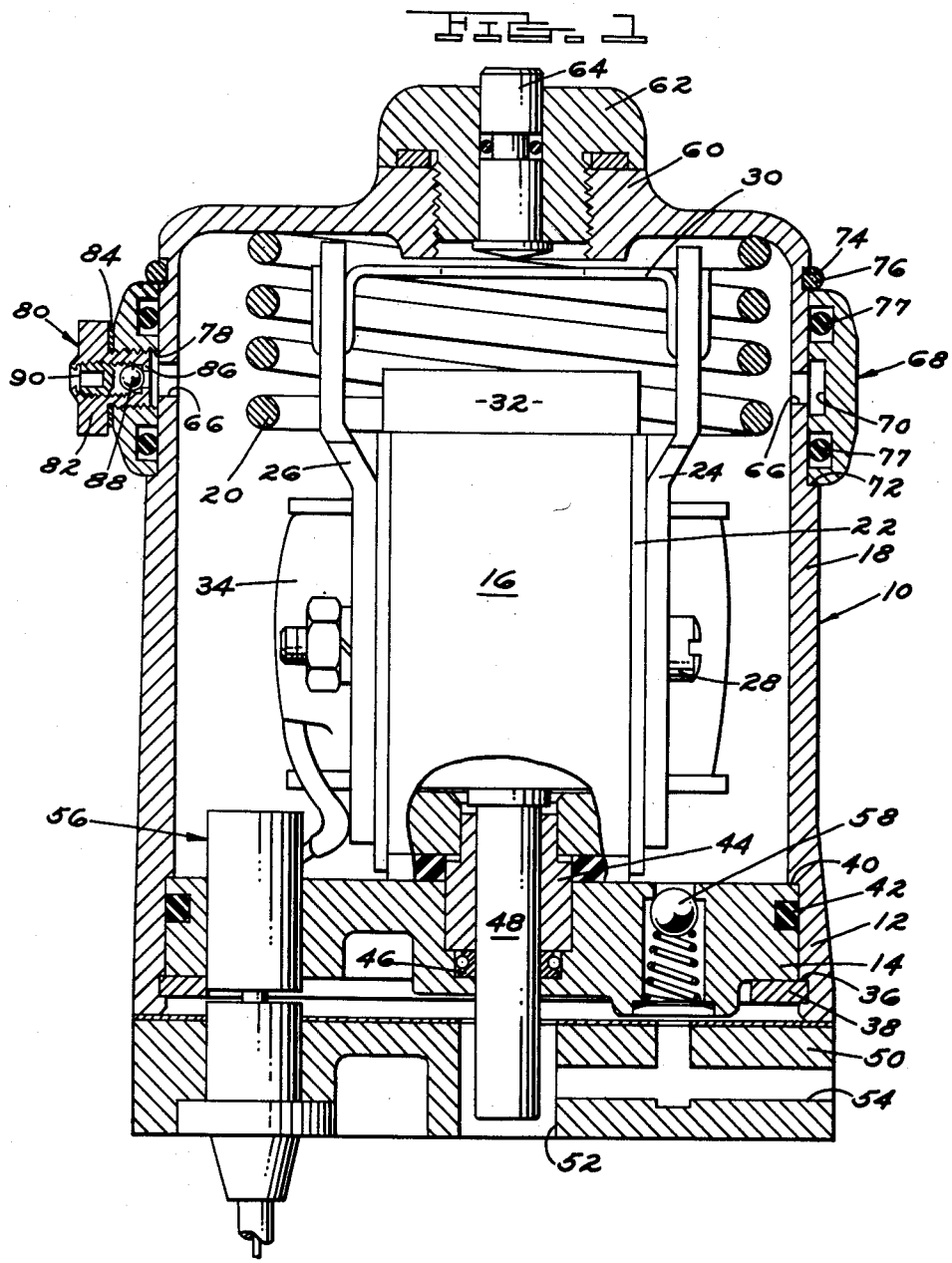
INVENTORS
EDMOND A. VIALE
LOUIS R. CONRATH
BY
*Burton & Parker*
ATTORNEYS

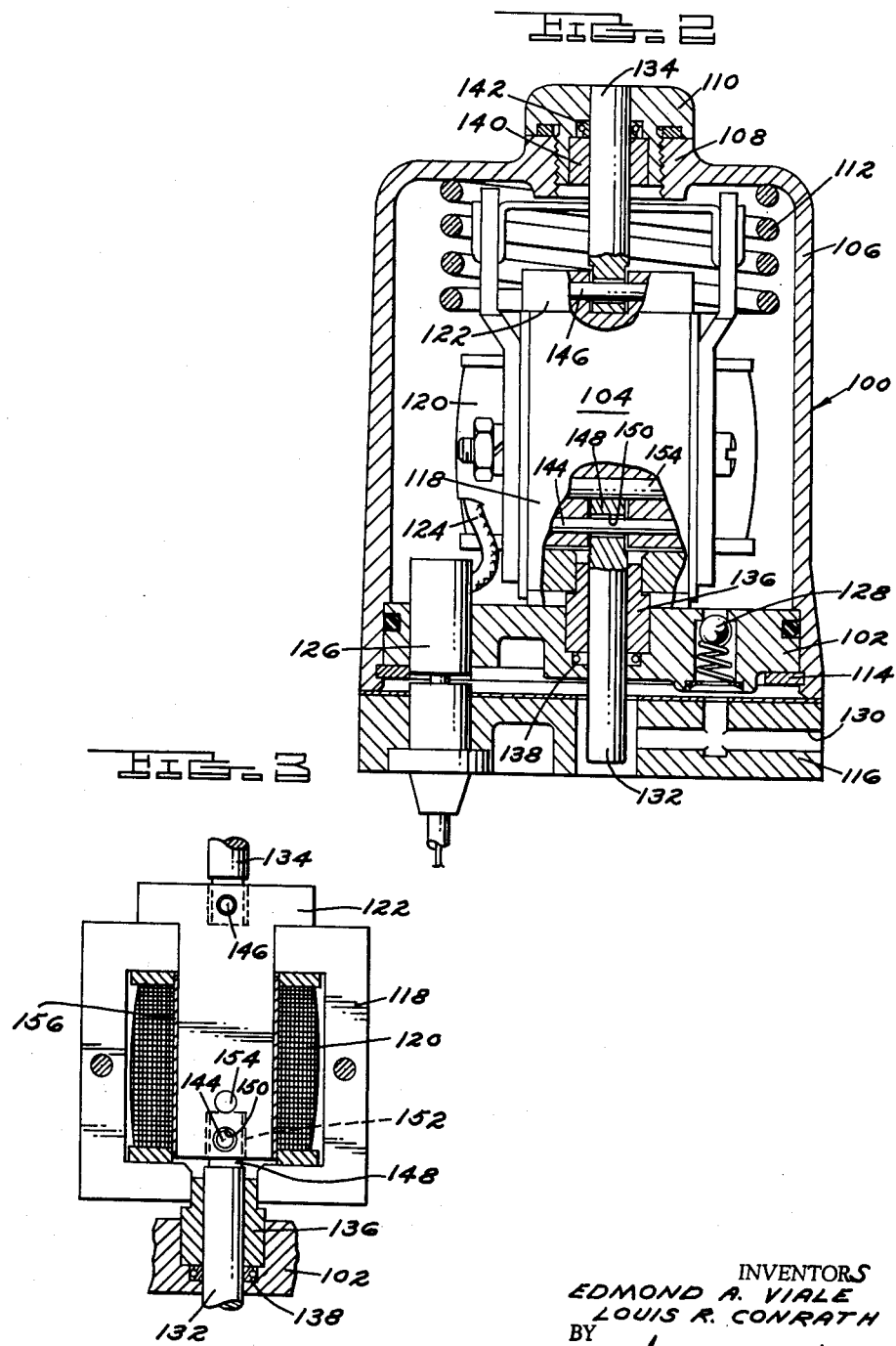

3,181,040
OIL BATH SOLENOID
Edmond A. Viale, Lathrup Village, and Louis R. Conrath, Huntington Woods, Mich., assignors to Detroit Coil Company, Ferndale, Mich., a corporation of Michigan
Filed July 30, 1962, Ser. No. 213,250
3 Claims. (Cl. 317—165)

This invention relates to solenoids and in particular to a pressure relief device for use in an oil bath solenoid.

In recent years oil bath solenoids of the type disclosed in United States Patent No. 2,975,340, assigned to the assignee of the instant application, have been used in ever-increasing numbers, replacing to a great extent prior solenoid designs operating in air. Of course, oil bath solenoids must be enclosed in an hermetically sealed housing to prevent the escape of the oily fluid bathing the solenoid. In order to relieve excessive pressures developed within the solenoid housing through excessive heating of the oily fluid therein, these solenoids may be provided with a pressure relief valve which opens at a selected pressure.

As is well known, the solenoid comprises generally a coil of wire adapted to be coupled to a source of electrical power, with a plunger disposed adjacent the coil to be attracted theretoward or thereinto upon energization of the coil. The plunger is either coupled to or adapted to abut the device to be actuated by the solenoid. Oil bath solenoids as above described have been found to give excellent service in myriad applications, having a life expectancy many times greater than conventional solenoids. However, in applications where the device to be actuated by the solenoid has a relatively small resistance to actuation, any build up of pressure within the solenoid housing tends to shift the plunger to actuate the device without energization of the coil. Setting the conventional relief valve to "blow off" at a relatively low pressure would result in many nuisance failures. Therefore there exists a need for a device which may be incorporated in an oil bath solenoid for use in certain applications to limit the housing or case pressure in the solenoid to a very low value, thus insuring against plunger movement when the coil is de-energized.

It is therefore the primary object of this invention to provide an oil bath solenoid having simple and novel means incorporated therein for preventing undesirable build up of pressure within the case housing the solenoid and thus preclude any possibility of operation of the solenoid unless and until the solenoid coil is energized.

Other objects, advantages and meritorious features will more fully appear from the following specification, claims and accompanying drawings, wherein:

FIG. 1 is a cross sectional view of an oil bath solenoid provided with a pressure relief device embodying the invention;

FIG. 2 is a cross sectional view of an oil bath solenoid showing means embodying the invention to balance the forces tending to shift the solenoid plunger; and FIG. 3 is a partial cross sectional view of the solenoid of FIG. 2 taken in a direction 90° from the the section of FIG. 2 and showing the relationship of various parts of the solenoid.

Referring now to FIG. 1, there is shown an oil bath solenoid incorporating a device embodying the invention. Details of the solenoids will be referred to herein only insofar as is necessary to afford an understanding of the invention. For a more detailed description of the solenoid, reference should be had to the U.S. patent of H. W. Jencks and E. A. Viale, No. 2,975,340 and the patent of H. W. Jencks, No. 2,671,187. The solenoid includes a closed housing generally indicated at 10 having a base portion 12. Within and forming a part of base portion 12 is a removable end wall 14 against which and upon which the solenoid, generally indicated at 16, is seated. Housing 10 includes a cover portion 18 of generally cylindrical shape which cooperates with end wall 14 to form a closed receptacle or case. A coil spring 20 bears at its lower end against the upper end of the C-stack 22 and at its upper end against the underside of cover 18, and tensions the solenoid 16 down against the end wall 14.

Solenoid 16 is of conventional construction in that it includes a C-stack 22 consisting of a plurality of laminated generally U-shaped plates held together by rivets, not shown, with a pair of frame 24 and 26 overlying opposite sides of the C-stack and secured thereto as by bolts 28 extending through the stack. A buffer plate 30 extends through suitable apertures in the upper portions of frames 24 and 26. Solenoid plunger 32 is of generally T shape, with the body of the T extending for reciprocal movement within the stack under the influence of a magnetic field created by a coil 34. It is understood that upon energization of coil 34 plunger 32 is attracted downwardly, and when the coil is de-energized, the plunger moves upwardly under the influence of a spring or the like in the device to be actuated (not shown).

The base portion 12 of housing 10 may be provided with an internal snap ring groove 36 within which a snap ring 38 is received to hold end wall 14 in place in the housing against the action of spring 20. Cover 18 and end wall 14 are provided with cooperating shoulders indicated at 40 to position the end wall within the housing. An O-ring 42 received within a groove in end wall 14 cooperates with housing 10 to seal the end wall in the housing. End wall 14 is provided with an aperture therethrough coaxially aligned with the reciprocatory movement of plunger 32. Received within such aperture is a bushing 44, with a sealing gasket 46 disposed at the lower end of a counterbore of the aperture, with the bushing overlying the gasket to retain the latter in place. Actuating rod means 48 is positioned for reciprocatory movement in bushing 44 and gasket 46, the gasket preventing escape of oily fluid along the actuating rod means. Upon downward movement of plunger 32, the lower end of the plunger abuts the rod means 48, shifting the latter downwardly against the device to be actuated (not shown).

The solenoid unit is shown as being mounted upon an adapter plate 50, which may be secured to the device to be actuated by the solenoid, and is left secured thereto when the solenoid unit is removed for servicing or replacment. It is understood that the plate 50 may be dispensed with where the device to be actuated is especially designed for use with the oil bath solenoid shown. Plate 50 includes an aperture 52 through which the actuating rod means 48 extends. A visible inspection drain groove 54 open into aperture 52 such that any leakage of oily fluid past gasket 46, or leakage of hydraulic fluid, for example, out of the device to be actuated, will be evident.

Cooperating electric terminal means generally indicated at 56 may be provided for automatically effecting an electrical connection between the solenoid and the device to be actuated. In addition, such oil bath solenoids may be equipped with a pressure relief valve shown at 58 to relieve excessive pressure within the housing. Cover 18 may also be provided with a threaded boss 60 having a packing and bushing nut 62 threadedly engaged therein, with a manual reset button 64 extending reciprocably through the nut. Each of these features are disclosed in the above mentioned Patent 2,975,340 and need not be further described herein.

In some applications in which solenoids are utilized to actuate devices such as valves or the like, the spring force of the device to be actuated is just sufficient to return actuating rod means 48 and plunger 32 to their uppermost position when coil 34 is deenergized. In such situations, any build up of pressure within housing 10 will tend to shift the plunger 32 downwardly to actuate the device, even though coil 34 is not energized. Of course, such an accidental actuation of the device is undesirable, if not intolerable. Therefore some means must be provided to limit the pressure within the housing to prevent unwanted actuation of the device.

To insure against pressure build up within housing 10, cover portion 18 is provided with a series of spaced-apart apertures 66 extending therethrough, two of which are shown in FIG. 1. Usually four such apertures are provided, spaced at 90 degree intervals around the circumference of cover 18. Encircling cover 18 and overlying apertures 66 is a ring-like member 68 exhibiting an inwardly opening annular recess 70 therearound communicating with apertures 66. Ring 68 is rotatable about the cover 18 for purposes described herebelow. To hold the ring in position on the housing and still permit rotation of the ring, the cover 18 is provided with a shoulder 72 cooperating with the ring to limit its downward movement, and a snap ring groove 74 within which is positioned a snap ring 76 to prevent upward movement of the ring 68. Thus the ring may be slid over cover 18 into abutting relation with shoulder 72, and then snap ring 76 positioned on the cover whereby the ring 68 is held against movement longitudinally of the cover.

When the unit is mounted in an upright position, as shown in FIG. 1, the level of oily fluid in housing 10 is below the apertures 66. However, when the unit is placed in a horizontal position, some of the apertures 66 are beneath the level of oily fluid. To prevent escape of such oily fluid from the housing around ring 68, the ring is provided with a pair of suitable recesses within which are disposed O-rings 77, one on either side of apertures 66, as shown in FIG. 1.

Ring-like member 68 is provided with a threaded aperture 78 into which is threaded a plug 80 having an enlarged head portion as shown at 82. Suitable gasket means such as the rubber gasket 84 provides a fluid-tight seal between ring and plug. The inner end 86 of plug 80 defines a fluid orifice and a valve seat, within which is seated a ball member 88 blocking the orifice. A set screw 90 is provided for threaded engagement within threaded aperture 92 in plug 80 to abut ball 88 and hold it unyieldingly against movement during transportation and installation of the solenoid unit. When the unit is mounted for operation upon a device to be actuated, the set screw 90 is unthreaded from plug 80 and removed.

The solenoid unit is adapted to be mounted either in an upright position, as shown in FIG. 1, or in a horizontal position, that is, lying on its side. For vertical mounting, base down, the unit is secured to the device to be actuated, screw 90 is removed, and the solenoid is ready to operate. As the level of oily fluid in the solenoid unit is below the row of holes 66 when the unit is in an upright position, as shown in FIG. 1, there is no danger of such fluid leaking out of the solenoid housing 10 during operation under normal conditions. In addition, ring 68 may be rotated to any convenient location, as the annular passage 70 in the ring establishes communication between the interior of housing 10 through apertures 66 and the orifice in member 80.

In mounting the unit in a horizontal position, ring 68 must be rotated to dispose member 80 at the top of housing 10. The unit may be placed in any convenient horizontal mounting position and secured to the device to be actuated. Ring 68 is then rotated with respect to cover 18 to bring plug 80 to the uppermost portion of the cover, disposing the plug orifice and a portion of passageway 70 above the level of oily fluid in the housing. Set screw 90 is then removed, and ball 88 is held by its own weight against seat 86. Upon an increase in fluid pressure due to heating of the oily fluid within housing 10, ball 88 will be lifted away from its seat to allow the escape of air from the housing, thus relieving the pressure within the housing, and obviating any possibility of plunger 32 being shifted by pressure build up. The device thus limits pressure within the housing to the weight of the ball 88, which weighs only a few ounces at the most.

It will be apparent that the ball 88 may be eliminated entirely, leaving the interior of housing 10 open to the atmosphere when the solenoid unit is mounted with plug 80 above the level of oily fluid within the housing. This of course results in the solenoid being vented to the atmosphere, resulting in the pressure within housing 10 being limited to the surrounding atmospheric pressure. Conversely, ball 88 may be tensioned against its seat by means of a very light spring (not shown), in which case the pressure within housing 10 would be limited by the force of the spring against ball 88.

As described hereinabove, a pressure relief valve 58 may be provided, as shown in FIG. 1. Such a valve serves to relieve excessive fluid pressure within housing 10 in the event ring 68 and its associated pressure relief means are inoperative. Thus, when the solenoid unit is mounted in an inverted position, i.e. with ring 68 at the lower end, the oily fluid in the housing completely covers all of the apertures 66. Therefore, in the event it is desired to mount the unit in an inverted position, set screw 90 is tightened against ball 88, sealing the unit against escape of oily fluid through apertures 66. In this situation, spring-loaded ball 88 operates as a pressure relief valve to relieve excessive pressure within housing 10 due to overloading of the solenoid.

In FIGS. 2 and 3 there is shown another embodiment of the invention. The solenoid of FIGS. 2 and 3 generally comprises a closed housing 100 having a removable end wall 102, against which and upon which the solenoid 104 is seated. Housing 100 includes a cover portion 106 defining an internally threaded embossment 108, having a packing and bushing nut 110 engaged therein. A coil spring 112 is interposed between cover 108 and solenoid 104, biasing the solenoid against end wall 102, which is held within housing 100 as by a suitable snap ring 114. As shown in FIG. 2, the solenoid unit may be mounted on an adapter plate 116, which is secured to the device to be actuated by the solenoid, and is left secured thereto when it is necessary to remove the solenoid for repair or replacement. Plate 116 may be dispensed with where the device to be actuated is designed specifically for use with the oil bath solenoid shown.

The solenoid is of conventional construction in that it comprises a generally U-shaped frame, commonly called a C-stack 118 housing a solenoid coil 120. A solenoid plunger 122 generally T-shaped in cross section is adapted to reciprocate within the frame through the coil 120 under the influence of a magnetic field created by the coil. Lead wires, one of which is shown at 124, connect coil 120 with terminal means 126 which are adapted to be connected with a source of electric power. A pressure relief valve comprising a spring-loaded ball member 128 may be received in a suitable recess in end wall 102, with the ball serving to relieve excessive pressures developed in the housing 100 through excessive heating of the oily fluid therein by a solenoid. The relief valve 128 communicates with a passageway 130 in plate 116, as shown in FIG. 2. A more detailed description of the solenoid unit shown may be had by reference to the U.S. patent of H. W. Jencks and E. A. Viale, No. 2,975,340.

Pressure relief valve 128 is essentially a safety valve, which opens to relieve pressure within the housing in case the solenoid becomes electrically overloaded so that the armature is not permitted to close, which results in heating of the oily fluid within housing 100. When this occurs, ball 128 is shifted away from its seat, and the oily fluid allowed to escape through passageway 130.

It is presently common practice to provide a relief valve that will open at a pressure in the neighborhood of 40 pounds per square inch. While this valve works excellently to prevent rupture or explosion of the housing, there are situations where a build up of any pressure within the housing 100 is undesirable. For example, when the solenoid unit is installed to actuate a device having a shiftable part (not shown), the actuating rod of the solenoid, shown at 132 in FIGS. 2 and 3, abuts such part of the device, and upon energization of coil 120, plunger 122 shifts rod 132 to move the shiftable part. A spring is provided biasing said shiftable part toward rod 132, and upon de-energization of coil 120, the spring returns rod 132 and plunger 122 to their normal positions.

Any build up of pressure within the solenoid housing caused by heating of the oily fluid filling the housing, tends to shift the rod even though the coil is not energized. As this tendency is only resisted by the spring on the device to be actuated, there is a possibility that the rod may accidentally shift to actuate the device, especially if a relatively light spring is used in the device to bias the solenoid to its normal position. This of course can be a dangerous condition.

To overcome any tendency of actuating rod 132 to shift due to pressure build up in housing 100, there is provided another rod 134 which extends from the opposite end of plunger 122. Rods 132 and 134 are of identical diameters and thus any forces within housing 100 tending to shift actuating rod 132 in one direction will likewise be acting on rod 134 in an opposite direction, resulting in a zero resultant force tending to shift plunger 122. Hence the plunger will not shift through coil 120 unless the coil is energized, setting up the magnetic field to attract the plunger 122.

Actuating rod 132 extends through an aperture wall 102 and is supported for reciprocation in a suitable bushing 136, coaxially aligned with movement of plunger 122. To prevent the escape of oily fluid from the housing around rod 132, a suitable gasket is provided as shown at 138, disposed at the lower end of a counterbore in the aperture. Bushing 136 overlies gasket 138 to retain the latter in position. Rod 134, on the other hand, extends through a suitable aperture in bushing nut 110, and is supported in bushing 140, coaxially aligned with movement of plunger 122. Gasket 142 prevents the escape of oily fluid around rod 134. Gaskets 138 and 142 are preferably constructed of Teflon or the like, embraced by an O-ring to tension the gasket about the rod.

Rods 132 and 134 are floatingly, non-separably connected to plunger 122 by means of pins 144 and 146 respectively extending through the plunger 122 in a direction transverse to plunger movement. Referring to actuating rod 132, it may be provided with a reduced diameter end portion 148 provided with a transversely extending aperture 150 therethrough, which aperture is of greater diameter than the diameter of cross pin 144 to permit slight longitudinal shifting of rod 132 relative to plunger 122. In addition a recess 152 is provided in plunger 122 to accommodate rod portion 148, and such recess is oversize the end portion of the rod to permit slight lateral movement of rod 132 relative to plunger 122. At the inner end of recess 152 there is provided a hardened tool steel dowel pin 154 which the inner end of rod 132 may abut when the plunger 122 is shifted by energization of coil 120. As plunger 122 is made up of a plurality of laminated plates, which could be deformed by the repeated impact of rod 132 thereagainst, pin 154 is interposed between the end of rod 132 and the plunger. Dowel 154 therefore serves as an abutment for rod 132, and may in addition be brazed in place to hold the laminations of plunger 122 together.

Rod 134 is similarly connected to the opposite end of plunger 122, as shown in FIGS. 2 and 3, it being not necessary to repeat the constructional details for such rod, as they are identical with those above recited with respect to rod 132. However, as rod 132 is an actuating rod which abuts a shiftable part to be actuated (not shown), pin 154 is provided, as described. Rod 134 is subjected to no external forces, so a dowel pin such as 154 is not absolutely necessary for rod 134. It should be noted that when plunger 122 shifts upwardly from the position shown, rod 134 will project up out of nut 110, whereby it also serves as a manual reset button.

As shown in FIG. 2, coil 120 may be provided with a sleeve lining 156 disposed in the central passage thereof through which the shank portion of plunger 122 reciprocates. As plunger 122 must shift freely within the coil, lining 156 cannot embrace the shank of the plunger tightly. Thus it is possible that the shiftable movement of plunger 122 will not be in an absolutely straight line. Moreover, it is difficult, from a purely practical standpoint, to insure that the bushings 136 and 140 will be in absolute alignment. In order to prevent binding of rods 132 and 134 within bushings 136 and 140 due to slight misalignment or minute variations in plunger movement, the rods 132 and 134 are floatingly but non-separably connected to plunger in the manner above described.

What is claimed is:

1. In an oil bath solenoid assembly for shifting a part to be actuated: an hermetically closed housing, a solenoid in the housing having a reciprocable plunger, an oily fluid filling the housing and bathing the solenoid and plunger, an actuating rod floatingly, non-separably connected to one end of said plunger for reciprocation therewith and extending sealingly through a wall of said housing to shift said part to be actuated upon movement of said plunger, a second rod floatingly, non-separably connected to that end of the plunger opposite said actuating rod for reciprocation with the plunger and extending sealingly through an opposite wall of said housing, said actuating rod and said second rod being substantially coaxially aligned with said plunger, with the cross sectional areas of said rods being substantially identical to balance the forces on said plunger resulting from fluid pressure build up within said housing.

2. The invention as defined in claim 1 characterized in that said assembly includes a fluid pressure control valve communicating with the interior of the housing and vented to the atmosphere for allowing the escape of excessive fluid pressure within said housing.

3. In an oil bath solenoid assembly for shifting a part to be actuated: an hermetically closed housing, a solenoid in the housing having a reciprocable plunger, an oily fluid in the housing bathing the solenoid and plunger, a pair of actuating rods floatingly, non-separably connected to said plunger at opposite ends thereof and having portions projecting respectively through oppositely disposed walls of said housing, one of said rods adapted to shift said part to be actuated, said pair of rods being of substantially identical cross sectional areas, and gasket means encircling each of said rods and cooperating with said housing to prevent leakage of the oily fluid out of the housing around said rods.

References Cited by the Examiner

UNITED STATES PATENTS

| | | | |
|---|---|---|---|
| 2,544,476 | 3/51 | Venning | 137—505 |
| 2,819,728 | 1/58 | Gage et al. | 137—505.11 |
| 2,887,123 | 5/59 | Becker | 137—505.11 |
| 2,971,537 | 2/61 | Kowalski et al. | 137—505.11 |
| 2,975,340 | 3/61 | Jencks et al. | 317—191 |

JOHN F. BURNS, *Primary Examiner.*